(12) United States Patent     (10) Patent No.:   US 12,585,305 B2

Huynh et al.     (45) Date of Patent:    Mar. 24, 2026

(54) REMOVABLE COMPUTER FOR AN AIRCRAFT

(71) Applicant: THALES, Courbevoie (FR)

(72) Inventors: Rémi Huynh, Merignac (FR); Fabien Kuntz, Merignac (FR)

(73) Assignee: THALES, Courbevoie (FR)

( * ) Notice: Subject to any disclaimer, the term of this patent is extended or adjusted under 35 U.S.C. 154(b) by 376 days.

(21) Appl. No.: 17/853,836

(22) Filed: Jun. 29, 2022

(65) Prior Publication Data

US 2023/0017493 A1     Jan. 19, 2023

(30) Foreign Application Priority Data

Jul. 13, 2021    (FR) ...................................... 2107618

(51) Int. Cl.
| | |
|---|---|
| *G06F 1/16* | (2006.01) |
| *G06F 1/18* | (2006.01) |
| *H04L 9/40* | (2022.01) |
| *H04L 67/12* | (2022.01) |

(52) U.S. Cl.
CPC ............ *G06F 1/1632* (2013.01); *G06F 1/189* (2013.01); *H04L 63/0227* (2013.01); *H04L 63/0876* (2013.01); *H04L 67/12* (2013.01)

(58) Field of Classification Search
CPC ... G06F 1/1632; G06F 1/189; H04L 63/0227; H04L 63/0876

USPC .......................................................... 726/16
See application file for complete search history.

(56) References Cited

U.S. PATENT DOCUMENTS

| | | | |
|---|---|---|---|
| 11,496,566 B2 * | 11/2022 | Uczekaj | .................. H04L 67/12 |
| 2018/0366008 A1 | 12/2018 | Dacre-Wright et al. | |
| 2019/0109713 A1 * | 4/2019 | Clark | ..................... G06F 16/182 |
| 2019/0304209 A1 * | 10/2019 | Huynh | .................. G07C 5/0816 |
| 2021/0044579 A1 * | 2/2021 | Nelson-Gal | ........... H04L 63/062 |
| 2022/0103517 A1 * | 3/2022 | Luotojärvi | .......... H04L 63/0876 |

FOREIGN PATENT DOCUMENTS

| | | |
|---|---|---|
| EP | 3 546 888 A1 | 10/2019 |
| FR | 3 075 357 A1 | 6/2019 |

* cited by examiner

*Primary Examiner* — Linglan Edwards
*Assistant Examiner* — Phuc Pham
(74) *Attorney, Agent, or Firm* — BakerHostetler

(57) ABSTRACT

A computer for an aircraft includes a dock part installed fixedly in the aircraft: configured so as to be connected to at least one avionics equipment by way of a bidirectional data bus, comprising a docking station, a server part installed removably on the docking station of the dock part, configured so as to exchange data and signals with the dock part through a connector, and configured so as to be connected to at least one non-avionics equipment through at least one communications link, the dock part being configured so as to implement a pairing mechanism with the server part in order to authorize or prevent the transmission of data between the server part and said at least one avionics equipment.

8 Claims, 3 Drawing Sheets

REMOVABLE COMPUTER FOR AN AIRCRAFT

CROSS-REFERENCE TO RELATED APPLICATION

This application claims priority to foreign French patent application No. FR 2107618, filed on Jul. 13, 2021, the disclosure of which is incorporated by reference in its entirety.

FIELD OF THE INVENTION

The invention relates to the technical field of avionics and air operations in general, and relates more particularly to the management, acquisition, broadcasting and synchronization of data relating to a civilian or military aircraft.

These data may be of multiple orders:

avionics data (or flight data), which are parameters specific to the aeroplane intended for flight data recorders, and parameters of the aeroplane that are computer-generated, such as for example inertial positioning references (or inertial reference data) or data from the flight management system (or FMS data), etc.;

maintenance data, for example entries from the on-board technical logbook (or aircraft technical logbook entries), software downloadable on the ground (or field loadable software), avionics databases, failures of and alarms from the on-board computer (or aircraft computer failures & warnings), etc.;

operational flight data: for example flight folders, operational statuses, fuel quantities, flight plans, etc.

BACKGROUND

An aircraft is a means of transport capable of moving within the Earth's atmosphere, such an aeroplane, a helicopter or a drone. The aircraft processes an amount of digital data, intended or not intended to be transmitted and/or modified by equipment external to the aircraft, such as for example the avionics data, the maintenance data and the operational flight data described above.

In order to be able to communicate with third-party equipment, whether external to the aircraft (for example maintenance servers, flight data recorders) or internal (for example electronic flight deck organizers, better known by the name electronic flight bag or EFB, used by the flight crew to consult the operational flight data), aircraft have computers that perform functions of processing avionics data and gateway functions between the equipment of the aircraft and the third-party equipment. These computers may have various wired or non-wired types of connectivity, for example Bluetooth, Wi-Fi (acronym for Wireless Fidelity), 4G (for fourth-generation mobile telephony standard), satellite link (satcom), etc. They may act as access point on board the aircraft, for example Wi-Fi, so that the flight crew have access to the avionics data, and/or so that the passengers have a communications link allowing them to access the Internet.

Systems embedded on board aeroplanes are reliable systems (or systems with guaranteed reliability), the failures of which may have variable consequences. A failure may be characterized by the loss of the function under consideration or by the production of erroneous data, with or without detection of an error. Depending on the level of criticality of the feared consequences, the probability of occurrence of errors must be kept below an acceptability threshold. Thus, the more critical the consequence, the lower the acceptable probability of occurrence. For example, in aeronautics, a catastrophic event (possibly leading to multiple deaths) must have a probability of occurrence below 10-9 per flying hour, while a major incident (possibly leading to a reduction in safety margins and operational capabilities, an inconvenience or minor injuries) must have a probability of occurrence below 10-5 per flying hour. The architecture of the avionics system, along with the design of each component of the aircraft, must guarantee this probability of occurrence. This involves guarantees on fault rates of each equipment (physical faults), developments in accordance with stringent standards guaranteeing the reliability of the applications (for example DO-178, etc.) and sufficient software verification levels (functional and structural coverage of the tests). These demands impose a significant design and verification effort, and impose a limitation on the complexity of the processing operations that are implemented.

By contrast, some systems may be deemed as having consequences that are tolerable, non-critical or even without any significant operational impact. These are generally non-reliable systems, or systems with non-guaranteed reliability. The demands on the architecture, the physical components or the software processing operations are therefore lower, thereby making it possible to implement more complex processing operations, at the expense of development and verification efforts that are lower in comparison with a reliable system.

The communication equipment on board an aircraft is thus subject to regulatory constraints that vary according to the type thereof. The piloting avionics equipment installed on board the aircraft has to be certified by the aeronautical regulator, which issues a type certificate, or TC. The optional avionics equipment installed on board the aircraft has to be certified by the aeronautical regulator, which issues a supplemental type certificate, or STC. The non-avionics optional equipment not installed on board the aircraft only has to be approved by the aeronautical regulator, which issues an operational approval, or OA.

The computers providing the link between the data internal to the aircraft and the third-party equipment are of course subject to these certification or approval rules. The computers according to the prior art, when they are equipment installed on board aircraft and that has access to potentially critical avionics data, have to be subject to a type certificate (TC). Their development is then subject to complex developments (quality assurance), and updating them is a lengthy and expensive process.

To address this problem, the Applicant has filed European patent application EP 3,546,888 A1, in which it describes a computer for an aircraft, formed of two parts:

a dock part, or dock, connected to the avionics system, to various in-flight connectivity systems and having a docking station (reception support). When it is an equipment installed in the aeroplane, it has to be certified with a TC or STC, a server part, or server, configured so as to be able to be installed on and coupled to the dock part by way of the docking station. The server has processing and storage resources, along with various connectivity systems to third-party equipment. When it is a portable system that is not installed in the aeroplane and not critical, it has to be certified only with an OA.

The advantage of such a two-part computer structure is that the server part is able to be modified or updated for a conventional cost and development period. Indeed, since it is not installed fixedly in the aircraft, it is not subject to a certification with a TC or STC. The server part organizing the communications with third-party equipment and comprising "the intelligence" of the computer is the part most liable to have to be updated. By contrast, the dock part installed in the aircraft has to be certified with a TC or STC. However, the software functions that it executes are far less susceptible to have to be updated than those of the server part.

In order to prevent any injection of accidental or malicious data into certified systems and to guarantee protection against cyber risks, the two-part computer described in the prior art has a unidirectional link for receiving data from the avionics part. This unidirectional link makes it possible to avoid data being injected onto the avionics part of the aircraft by the equipment to which the server part is connected or by a server part modified for malicious purposes, in order to guarantee the security of the critical systems of the aircraft. The trade-off is that controlled data injections onto the avionics part are impossible.

This solution exhibits other defects:

it is not protected against unintentional server swaps, a server part being able to be installed on a dock part different from the aeroplane for which it is intended, possibly leading to confusion regarding the received avionics data, it is not protected against the introduction of server parts modified for the purpose of illegitimately transmitting avionics data, and therefore does not make it possible to protect the confidentiality of the data of the aircraft.

SUMMARY OF THE INVENTION

The computer for an aircraft according to the invention aims to address all of these problems while securing the link between the two parts.

To this end, the present invention describes a computer for an aircraft, configured so as to connect at least one non-avionics equipment to at least one avionics equipment on board the aircraft. The computer according to the invention comprises:

a dock part configured so as to be installed fixedly in the aircraft, said dock part:

being configured so as to be connected to said at least one avionics equipment, comprising a docking station, a server part configured so as to be installed removably on the docking station of the dock part, the dock part and the server part then being configured so as to exchange data and signals through a connector, the server part being configured so as to be connected to said at least one non-avionics equipment through at least one communications link.

In the computer according to the invention, the dock part is connected to said at least one avionics equipment by way of at least one bidirectional data bus. It is configured so as to implement a pairing mechanism with the server part, and to authorize or prevent the transmission of data in at least one direction between the server part and said at least one avionics equipment based on the state of said pairing mechanism.

Advantageously, the dock part is subject to a type certificate (TC) or a supplemental type certificate (STC), and the removable part is subject to an operational approval (OA).

According to one embodiment, the dock part and/or the server part are configured so as to implement functions of analysing and filtering the data transmitted by said at least one avionics equipment to said at least one non-avionics equipment.

According to one additional embodiment, the dock part and/or the server part are configured so as to implement functions of analysing and filtering the data transmitted to said at least one avionics equipment by said at least one non-avionics equipment.

According to one embodiment, the server part comprises computing means for implementing the pairing mechanism.

Advantageously, the dock part is configured so as to provide one or more power supply links to the server part.

Advantageously, the dock part comprises means for disconnecting one or more communication links of the server part.

Advantageously, the dock part is configured so as to be connected to an in-flight connectivity system, and the server part is configured so as to access said in-flight connectivity system through the dock part.

According to one embodiment, the server part is configured so as to implement a pairing mechanism with at least one non-avionics equipment, and to authorize or prevent the transmission of data with said equipment based on the state of said pairing mechanism.

BRIEF DESCRIPTION OF THE DRAWINGS

The invention will be better understood and other features, details and advantages will become more clearly apparent from reading the following non-limiting description, and by virtue of the appended figures, given by way of example, among which.

Identical references may be used in different figures when they denote identical or comparable elements.

DETAILED DESCRIPTION

Figure 1:
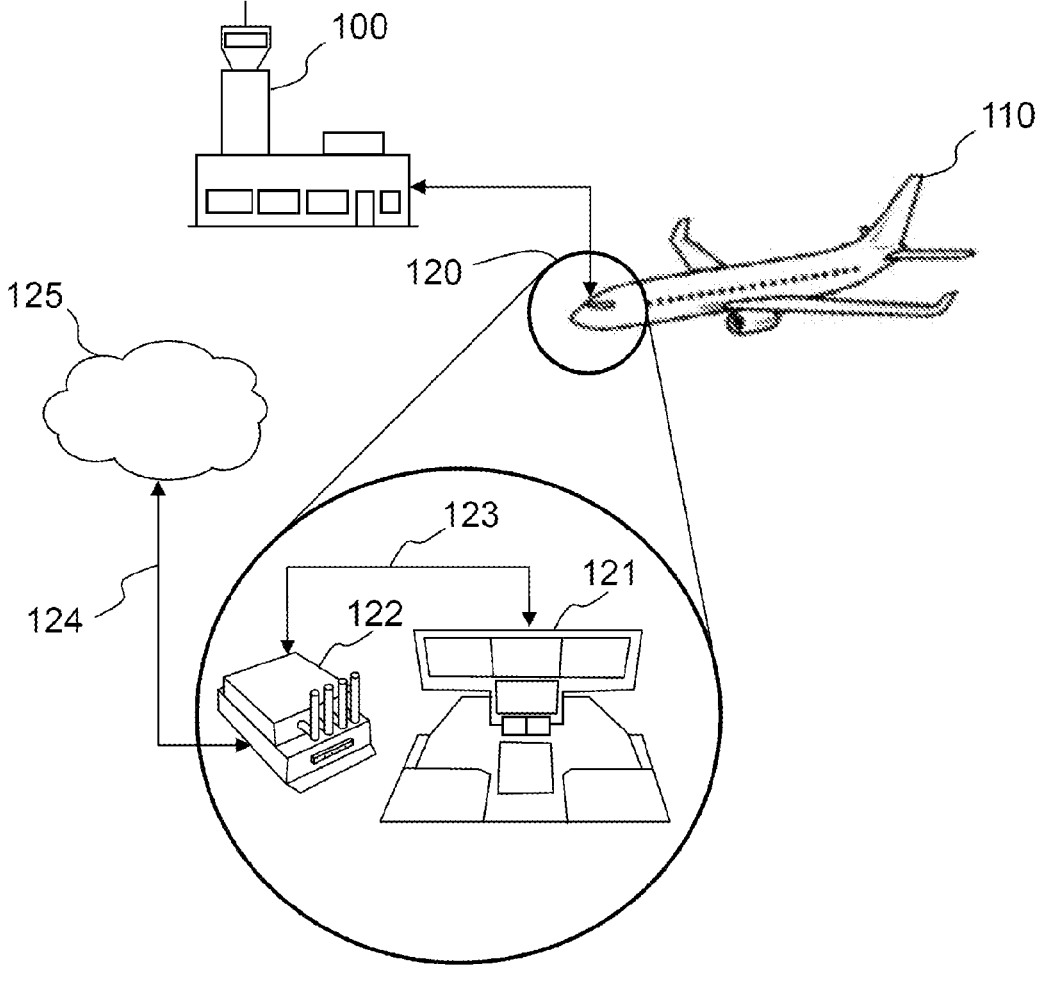
FIG. 1 illustrates the overall technical environment of the invention.

FIG. 1 illustrates the overall technical environment of the invention.

It shows examples of "non-avionics" or "open (world)" systems (or "equipment") and "avionics" equipment (certified by the regulator with a TC or STC).

Means on the ground (control centres and engineering offices) 100 are in communication with an aircraft 110 possibly comprising a flight deck or a cockpit 120. The piloting equipment 121 thereof (called avionics equipment) is generally installed in the cockpit 120 when the aircraft has one. This equipment comprises for example one or more on-board computers (computing, memory and data storage means), including in particular one or more piloting avionics systems, but not on their own, data display, visualization and input means, communication means, along with (possibly) haptic feedback means. Other equipment, such as for example an EFB tablet, may be on board the aircraft. The device 122 according to the invention is able to interact (bilateral communication 123) with the (TC category) avionics equipment 121. The device according to the invention may also be in communication 124 with external computing resources, accessible via the network (for example cloud computing 125) or via communication links on the ground (such as a satellite link or air to ground or ATG link). In particular, computing operations may be performed locally on the device 122 or partially or fully in the computing means accessible via the network. The on-board equipment 121 is generally certified (categories TC or STC) and regulated, while the computing means 125 and connected equipment are generally not (or to a lesser extent, for example through operational approval).

Figure 2:
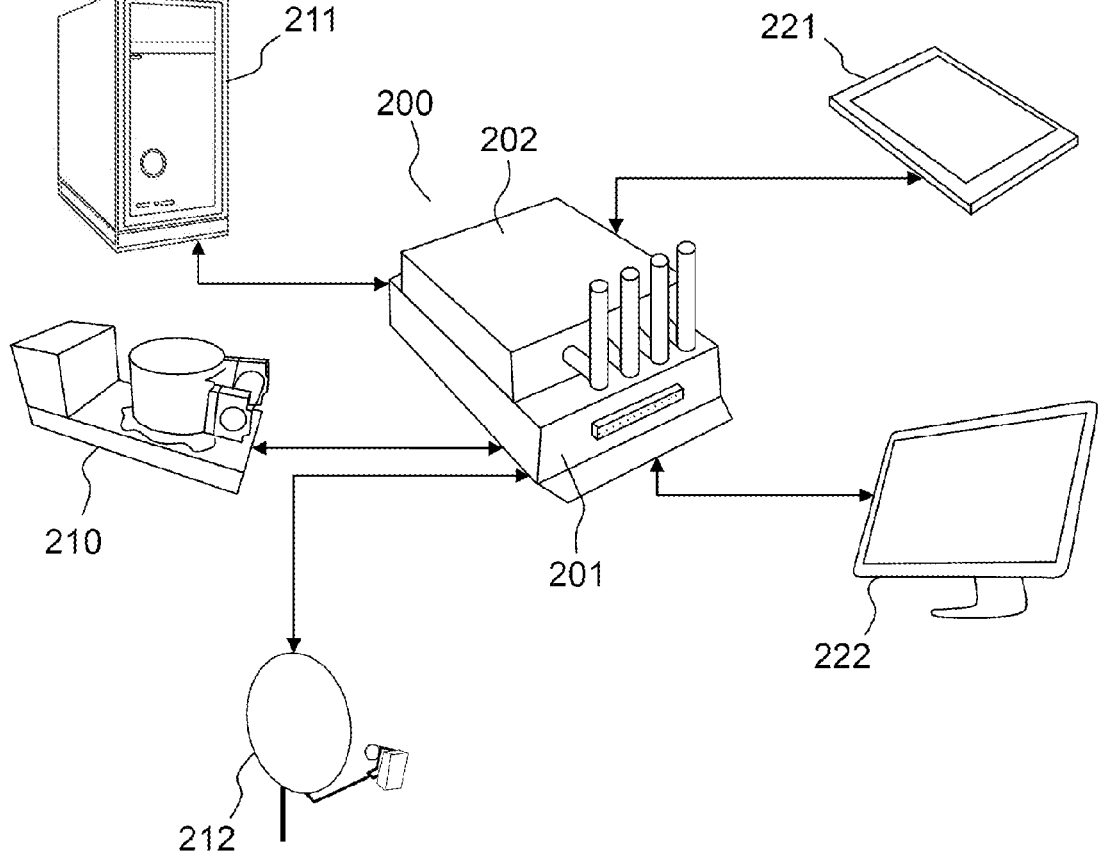
FIG. 2 more precisely shows a device according to one embodiment of the invention and its interactions with the avionics and non-avionics equipment.

FIG. 2 more precisely shows a device according to one embodiment of the invention and its interactions with the avionics and non-avionics equipment.

The computer 200 that is the subject of the invention comprises a first part 201, called dock part. This part is designed to be installed fixedly in the aircraft, and to be connected, through a bidirectional data bus, to the avionics equipment, such as the equipment 210 and 211 delivering the flight data and the avionics data. It may therefore be subject to TC or STC certification. It may be connected to in-flight communication means 212, such as a satellite link.

The dock part comprises computing means such as a processor, a digital signal processor (better known by the acronym DSP), a microcontroller, or a specialized circuit such as an ASIC (acronym for application-specific integrated circuit) or an FPGA (acronym for field-programmable gate array), and one or more memories. Finally, it comprises a docking station, or reception support, intended to receive the second part 202 of the computer, called server part. It may furthermore have connection means for connecting to a human-machine interface for entering and consulting flight plan information and piloting data and configuring the server part, such as a screen, a mouse, a keypad, a camera, a memory card reader, a USB port, etc.

The dock part 201 is connected to a power source of the aircraft, possibly an avionics power source, and may have batteries for operating when the power supply of the aeroplane is deactivated. In one embodiment, the dock part is configured so as to supply power to the server part 202 when it is inserted into the docking station. In another embodiment, the dock part comprises a power splitter configured so as to provide a double power supply line to the server part 202: a first line continuously supplying power to the server part when it is inserted into the docking station, and a second power supply line able to be connected or disconnected when the aircraft is in flight so as to suspend or disconnect cellular communications of the server part in order to avoid any electromagnetic interference with the certified on-board avionics computers. Finally, the docking station comprises an interface for transmitting data and signals between the dock part and the server part.

The server part 202 is removable: it may be attached or detached manually to or from the dock part 201 using any fastening means, advantageously a fastening means not requiring any tools, such as quarter-turn wing nuts or retaining springs. Advantageously, an anti-theft protection device (for example using a security seal, a key, a code, a PIN, a fingerprint, etc.) makes it possible to safeguard the removal of the server part.

The server part 202 may be supplied with power by the dock part, and/or have dedicated power supply means, such as a battery or cells. The dedicated power supply means make it possible to use the server part when the aeroplane is no longer able to supply power to the server through the dock, for example on the ground when the motor of the aircraft is deactivated and the aircraft is not connected to a parking outlet. In one embodiment, the server part 202 is electrically insulated from the power source of the aircraft. To this end, the dock part 201 may comprise an optocoupler configured so as to avoid or prevent notably any overvoltage in the certified avionics circuits.

Just like the dock part, the server part has computing means, such as a processor, DSP, microcontroller, FPGA or ASIC, and a memory. It also has means for wireless communications (for example cellular (2G, 3G, 4G, 5G), Wi-Fi, Bluetooth or the like) or wired communications (Ethernet link, SPI (serial peripheral interface), etc.) to non-avionics devices on board the aircraft, such as the EFB 221 or a server 222 located on the ground allowing data exchanges and the operational administration of the server part 202. It may be configured so as to access the in-flight communication means 212 through the dock part.

It may furthermore have connection means for connecting to a human-machine interface for entering and consulting avionics data, such as flight plan information and piloting data and configuring the server part, such as a screen, a mouse, a keypad, a camera, a USB port, a memory card reader, etc.

In one embodiment, the server 202 is configured so as to determine the state of the aircraft in flight or on the ground and to stop, suspend or disconnect all or some of the wireless, in particular cellular, communications in response to this state in order to prevent electromagnetic interference. The states may be qualified (for example taxiing, take-off, landing gear activated, deployed, in progress, etc.) and the consequences may also be modulated.

The server part may be seen as the "brain" or the management entity that "adjoins" the avionics part without interfering with it or risking corrupting it.

The dock part 201 is configured so as to implement a pairing mechanism with the server part 202. This pairing mechanism allows the dock part to authenticate the server part, and to block any exchange of data between the two parts of the computer, in just one direction or in both directions, when the server part is not identified, meaning that a non-identified equipment is not able to interfere with or corrupt the elements of the avionics part, including dock part, and that avionics data are not able to be transmitted illegitimately to third-party equipment. This pairing mechanism may be implemented using any means: simple authentication means, such as the transmission of a unique identifier, possibly encrypted between the server part and the dock part, or more robust authentication means, implemented for example in accordance with the SSL or IEEE 802.1x standard.

The two-part computer according to the invention has numerous advantages over the prior art. First of all, the server part requires only operational approval to be installed and used. It is therefore upgradable for a cost and a development time that are far less than equipment having TC or STC certifications. These upgrades may for example consist in introducing new hardware components, or of updates intended to ensure that the computer is compatible with new communication standards or to introduce new functionalities.

The dock part is less upgradable than the removable server part since it is certified with a TC or STC, but this part mainly interfaces with the avionics equipment, which is itself unlikely to change.

The pairing mechanism implemented between the dock part 201 and the server part 202 makes it possible to protect the device against risks linked to the ability to remove the server part:

risks of unintentional exchanges between the server parts
        of computers of two different aeroplanes, which would result in inconsistency in the data transmitted to remote monitoring and maintenance equipment, risks of intentional exchanges performed for the purpose of obtaining information about the operation of the aircraft (avionics data, operational data, proprietary data, video streams, etc.).

Only authentic servers compatible with the dock are able to receive/transmit data from/to the avionics part of the aircraft, thereby making it possible to protect the aircraft against server counterfeiting:

the pairing of the dock part with an authenticated server part makes it possible to guarantee that the avionics data leaving the aeroplane are transmitted to a trusted device;

the pairing of the dock part with an authenticated server part makes it possible to guarantee that the data injected onto the avionics part originate from a trusted device, and therefore to use a bidirectional data bus between the dock part and the server part, and not a unidirectional bus as in the prior art. This functionality is particularly important in terms of security due to the potentially critical role of the data injected onto the avionics part of the aircraft.

This pairing mechanism makes it possible to operate the link between the dock part of the computer and the avionics components through one or more bidirectional links, thereby making it possible to inject data from third-party equipment (EFB 221, device on the ground 222 or the like) onto the avionics part, such as for example flight plans, updates to databases, passenger lists, video streams, etc.

The pairing mechanism of the device according to the invention may be configured so as to allow multiple servers to connect to one and the same dock, so as to be able to swap the equipment for example in the event of failure or maintenance. By contrast, servers may be revoked when they are no longer intended to be used or when they disappear (loss or theft), thereby protecting the avionics part of the aircraft from the risk of an obsolete server part being retrieved and modified by a malicious individual for the purpose of introducing malicious data into the avionics system or retrieving avionics data.

Advantageously, the server part may be configured so as to implement an additional pairing mechanism with the non-avionics equipment to which it is connected, thus ensuring end-to-end authentication of the equipment accessing the avionics data of the aircraft.

In one embodiment, additional functions of analysing and filtering the data injected into the avionics system may be implemented by the computer according to the invention. In addition to the pairing mechanism, this filtering makes it possible to increase the security of the device by ensuring that the data injected onto the avionics part are correct. It may for example consist in verifying the format of the transmitted data (verifying the formats of messages and transport protocols that are used, headers, MAC addresses, packet sizes, transmission errors, etc.), in verifying the syntax of the exchanged data, in verifying whether the injected values are consistent, whether they are signed, etc. The filtering thus acts in the manner of a firewall in order to protect the components of the avionics part.

The functions of analysing and filtering the data injected onto the avionics part may be implemented in the dock part, that is to say as close as possible to the avionics part for a maximum security level, but are in this case less upgradable. As an alternative, they may be implemented in the server part. They are then easily upgradable. As an alternative, the analysis and filtering functions may be distributed between the dock part and the server part.

In one embodiment, analysis and filtering functions are implemented by the dock part and/or the server part on the data leaving the avionics system, in order to block the transmission of potentially sensitive data to non-avionics equipment.

Figure 3:
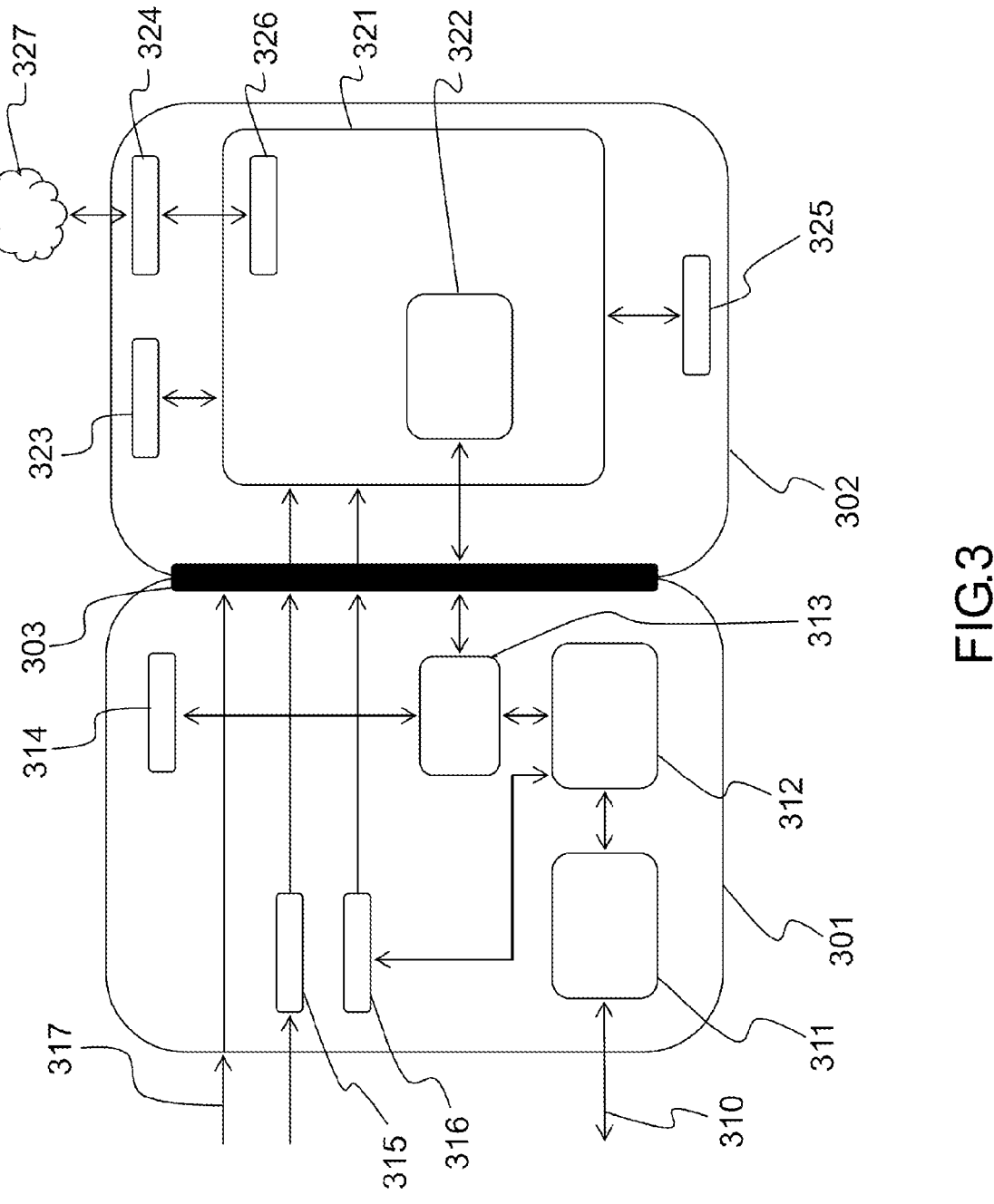
FIG. 3 shows the functional architecture of a computer for an aircraft, according to one embodiment of the invention.

FIG. 3 shows the functional architecture of a computer for an aircraft, according to one embodiment of the invention.

It comprises two parts: a dock part 301, intended to be installed fixedly in the aircraft, and a server part 302, intended to be installed removably on a docking station of the dock part. Once the server part has been installed on the dock part, the two parts are connected by a connector 303.

The dock part is supplied with power by an avionics power source 317, extending towards the connector 303 in order to supply power to the server part when it is installed on the docking station. Advantageously, the power supply line to the connector 303 may be duplicated in order to integrate additional functionalities, for example deactivating communication modules of the server part. Advantageously, the dock part may comprise devices intended to protect the power supply line 317 against overvoltages.

The dock part is connected to one or more items of avionic equipment through one or more bidirectional avionics data buses 310, for example a flight data recorder A717 or an avionics data transmission equipment A429. The bidirectional aspect of the bus makes it possible to retrieve and inject avionics data from and into this equipment.

The dock part may comprise means 314 allowing it to access a communication link to an in-flight connectivity system, for example a satellite link.

Advantageously, the dock part may comprise a device 311 for interfacing with the one or more avionics data buses, in order to route the avionics data on links such as SPI or Ethernet buses. This device may be configured so as to implement functionalities dedicated to exchanges with the avionics equipment (protocol management of the exchanges on the data bus 310, storing information, etc.). It may also be designed to electrically insulate the avionics data links, such as for example an optocoupler.

The dock part comprises computing means 312 intended to:

retrieve or inject avionics data through the one or more bidirectional communication buses 310, implement a pairing mechanism of the server part, and authorize or prevent the transmission of data between the server part and the avionics communication equipment accessible via the one or more bidirectional communication buses 310, in one direction or in the other, based on the state of this pairing mechanism, that is to say to block transmissions to/from a non-authenticated server part, advantageously, implement mechanisms for analysing and filtering data retrieved/injected from/into the avionics equipment of the aircraft.

Advantageously, the dock part may comprise means 313 for separating the data flows exchanged with the server part, configured so as to separate the avionics data flows from other flows, such as for example data flows from the in-flight connectivity system, such that the functions dedicated to security that are implemented by the server part are applied only to the avionics data. This makes it possible not to needlessly overload the computing means 312, and not to penalize the latency of the transmissions performed by the server part on the satellite communications link 314.

The computing means 312 and 313 are connected to the connector 303.

Finally, the dock part may comprise disconnection means 315 and 316 intended to suspend wireless communications (4G, 5G, Wi-Fi, Bluetooth, etc.) of the server part based on the state of the aeroplane, the state of the aeroplane being obtained either directly from the avionics equipment (module 315) or through avionics data processing performed by the computing means 312 (module 316). These devices may be configured so as to activate/block the power supply signals of the server part based on the state of the aeroplane, or to transmit dedicated control signals.

The server part 302 is configured so as to exchange data with the dock part 301 through the connector 303, in particular avionics data, one or more power supply signals and/or wireless communications control signals. It comprises computing means 321 associated with a memory and configured so as to:

> implement a pairing mechanism in connection with the computing means 312 of the dock part,
>
> implement an operating system intended to supervise the operation of the server part,
>
> implement applications 322 dedicated to avionics data processing, for example generating avionics data processing operations and reports for maintenance purposes, processing flight plans, updating avionics software, etc.
>
> establish various communication links to non-avionics equipment, such as EFBs, smartphones, laptop computers, flight data recorders on the ground, maintenance and remote control servers.

The server part may comprise a Bluetooth communications link 323, a Wi-Fi communications link 324 and/or a cellular communications link 325 (of 4G or 5G type or the like). According to one embodiment, the computing means 321 may be configured so as to implement a Wi-Fi access point 326 (or hotspot) in order to establish a local area network 327 in the aircraft, allowing various equipment to connect to the server part. It may also be configured so as to form the link between the various communication links and the in-flight connectivity system 314 that it accesses through the dock part.

Advantageously, the computing means 321 of the server part may be configured so as to implement functions of analysing and filtering avionics data injected into/retrieved from the dock part.

Advantageously, the server part may be configured so as to deactivate the various communication links 323, 324 and 325 based on control and power supply signals 315 and 316 transmitted by the dock part, or based on avionics data processed by the computing means 321.

Advantageously, the server part may be configured so as to implement pairing mechanisms with the non-avionics equipment to which it is connected, and authorize or prevent the transmission of data with said equipment based on the state of said pairing mechanism. This makes it possible to ensure the authenticity of all of the equipment that has access to the avionics data of the aircraft.

The architecture of the computer according to the invention shown in FIG. 3 is upgradable and may be provided with other functionalities intended for processing avionics data and for the connectivity of the computer.

Since it is removable and disconnectable from the dock part, the server part is not subject to high certification levels such as the TC and STC levels. The communication standards that it implements, the operating system and the applications that it houses, and the data analyses and any filtering operations that it performs may then be updated, possibly remotely, at the expense of a conventional cost and development time.

The invention claimed is:

1. An aircraft computer, comprising:

a dock part to be installed fixedly in an aircraft, said dock part:

being configured to be connected to at least one avionics equipment of the aircraft, and comprising a docking station, a server part, having processing and storage resources to implement avionics data processing applications, along with connectivity systems to non-avionics equipment and means for implementing a pairing mechanism with the dock part, said server part being configured to be installed removably on the docking station, such installation allowing the dock part and the server part to exchange data and signals through a wired connector, the server part being further configured to be connected to at least one non-avionics equipment through at least one communications link independent from the wired connector, wherein the dock part is connected to said at least one avionics equipment by way of at least one bidirectional data bus, and the dock part has a controller that implements the pairing mechanism through the wired connector between the dock part and the server part when the server part is installed on the dock part, and subject to the server part being authenticated through the pairing mechanism by the dock part, transmits data from the server part to said at least one avionics equipment to connect the non-avionics equipment and the avionics equipment, transmission of data from the server part to said at least one avionics equipment through the wired connector being prevented by the dock part when the server part is non-authenticated through the pairing mechanism by the dock part, the dock part also providing a power supply to the server part through the wired connector.

2. The computer for an aircraft according to claim 1, wherein the dock part is subject to a type certificate or a supplemental type certificate, and wherein the removable part is subject to an operational approval.

3. The computer for an aircraft according to claim 1, wherein the dock part and/or the server part implement functions of analysing and filtering data transmitted by said at least one avionics equipment to said at least one non-avionics equipment.

4. The computer for an aircraft according to claim 1, wherein the dock part comprises means for disconnecting one or more communication links of the server part with a non-avionics equipment, by blocking the power supply through the wired connector to the server part when the aircraft is in flight.

5. The computer for an aircraft according to claim 1, wherein the dock part is configured to be connected to an in-flight connectivity system, and the server part is configured to access said in-flight connectivity system through the dock part.

6. The computer for an aircraft according to claim 1, wherein the pairing mechanism is implemented using simple authentication means including a transmission of a unique identifier, between the server part and the dock part, or authentication means, implemented in accordance with the SSL or IEEE 802.1x standard.

7. The computer for an aircraft according to claim 1, wherein the controller of the dock part is upgradable as an avionics equipment of the aircraft whereas the processing and storage resources of the server part are upgradable as non-avionics equipment and Internet connected equipment.

8. The computer for an aircraft according to claim 1, wherein said non-avionics equipment includes Electronic Flight Bags, flight data recorders, maintenance and remote control servers.

\* \* \* \* \*